(12) United States Patent
Brett et al.

(10) Patent No.: US 7,002,635 B1
(45) Date of Patent: Feb. 21, 2006

(54) METHOD FOR SUPERIMPOSING PICTURES

(75) Inventors: Maik Brett, Hofheim (DE); Matthias Burkert, München (DE); Dirk Wendel, Unterhaching (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/914,664

(22) PCT Filed: Mar. 3, 2000

(86) PCT No.: PCT/DE00/00643

§ 371 (c)(1),
(2), (4) Date: Aug. 31, 2001

(87) PCT Pub. No.: WO00/54498

PCT Pub. Date: Sep. 14, 2000

(30) Foreign Application Priority Data

Mar. 5, 1999 (DE) ................................ 199 09 756

(51) Int. Cl.
*H04N 5/45* (2006.01)
(52) U.S. Cl. ............... 348/565; 348/563; 348/564; 348/521; 348/525
(58) Field of Classification Search ........ 348/565, 348/564, 563, 567, 569, 521, 524, 525, 531; H04N 5/45, H04N 5/445
See application file for complete search history.

(56) References Cited

U.S. PATENT DOCUMENTS

| | | | |
|---|---|---|---|
| 4,638,360 A | | 1/1987 | Christopher et al. |
| 4,984,082 A | * | 1/1991 | Okamura ............... 348/565 |
| 5,369,442 A | * | 11/1994 | Braun ................... 348/567 |
| 5,859,634 A | | 1/1999 | Ou et al. |
| 6,556,252 B1 | * | 4/2003 | Kim ...................... 348/565 |
| 6,559,896 B1 | * | 5/2003 | Zwartenkot et al. ..... 348/714 |

FOREIGN PATENT DOCUMENTS

| | | |
|---|---|---|
| EP | 0 288 152 | 10/1988 |
| EP | 0 318 986 A | 6/1989 |
| EP | 0 406 698 | 1/1991 |
| JP | 10-013760 | * 1/1998 |

OTHER PUBLICATIONS

Patent Abstracts of Japan, vol. 1998, No. 05, Apr. 30, 1998 & JP 10 013760 A (Matsushita Electric Ind. Co. Ltd.), Jan. 16, 1998 (abstract).
Patent Abstracts of Japan, vol. 1998, No. 01, Jan. 30, 1998 & JP 09 247531 A (NEC Corp.) Sep. 19, 1997 (abstract).
English Translation of PCT International Preliminary Examination Report, dated Nov. 30, 2000, 6 pgs.

* cited by examiner

*Primary Examiner*—John Miller
*Assistant Examiner*—Trang U. Tran
(74) *Attorney, Agent, or Firm*—Peter F. Corless; Steven M. Jensen; Edwards Angell Palmer & Dodge LLP

(57) ABSTRACT

In the case of picture insertions, such as picture-in-picture, for example, fluctuations in the line duration are manifested in position displacements relative to the desired position of the inserted pictures.

In order to prevent position displacements in the horizontal direction, it is provided that the insertion position is corrected in a manner dependent on a determined line duration. The method according to the invention is suitable in particular for picture-in-picture insertions in television receivers.

10 Claims, 1 Drawing Sheet

METHOD FOR SUPERIMPOSING PICTURES

BACKGROUND OF THE INVENTION

The invention relates to a method for picture insertion into video pictures, as is employed for example with television pictures. In the case of picture-in-picture insertion, a smaller second picture is inset into the usual television picture and can be viewed at the same time as the television picture. Picture insertion also includes the display of subtitles, operating menus and other representations which are generated by a character generator for display in the main picture.

For picture-in-picture insertion in video signal processing apparatuses, in particular television receivers, it is necessary to buffer-store the picture to be inserted in a frame memory in order to delay the picture signal of the picture to be inserted, so that it can be displayed synchronously with the main picture at a predetermined location on a display device, for example a screen. Synchronization with the main picture is effected using vertical and horizontal synchronizing signals in this case. In particular disturbances in the horizontal pulses become apparent in the horizontal picture position by virtue of shaking and displacements.

For synchronization of the insertion channel for the picture to be inserted with the main channel of the main picture, circuit arrangements with phase shifters are suitable, in which an output clock signal coupled to a reference pulse is generated, said signal having a high phase coupling.

In a phase shifter, the clock frequency is fixed. The number of clock cycles between two horizontal synchronizing signals of the main channel is dependent on the time interval between said signals. Synchronization is produced when the edge of the horizontal signal temporally coincides with the edge of the clock signal for the insertion channel.

A circuit arrangement for generating an output clock signal coupled to a reference pulse is described in DE 195 06 543 C1.

Line deflection in television receivers takes place independently of the picture signals. Therefore, signals of the main channel with a different line duration are always imaged onto the same section of the screen. Since the signals of the insertion channel are coupled to those of the main channel, changes in the line duration lead to position displacements of the inserted picture.

An example will illustrate this. A signal of the main channel with a length of 1 $\mu$s is imaged onto 1 cm of the screen. If the line duration changes by 5%, i.e. the signal is now 1.05 $\mu$s long, 1 cm can still be seen. However, a signal inserted after 10 $\mu$s is inserted after 10 cm, and after 9.5 cm in the case of the changed line duration, because the clock of the phase shifter is independent of the line duration of the main channel.

Since, in the case of a fluctuating line duration, the picture to be inserted changes its position within the main picture a number of times per second, a viewer is given the impression of a jittery picture to be inserted.

SUMMARY OF THE INVENTION

It is an object of the present invention to specify a method for insertion of a picture to be inserted, in which the position of the picture to be inserted within the main picture is independent of the line duration of the signal for the main picture.

This object is achieved by means of a method for inserting an inset picture into a main picture constructed from a plurality of lines, according to the present invention.

The invention provides for calculation of the position displacements of the inserted picture that are to be expected on account of changes in the line duration of lines of the main picture, and correction of the actual insertion position relative to a position to be chosen in the case of line durations that are always constant.

The invention has the advantage that undesirable position displacements of the inserted picture are avoided. This means that the inserted picture can be displayed in a manner free from jitter.

Furthermore, it is advantageous that the invention can be carried out using a digital circuit arrangement and existing synchronization circuits with phase shifter can be extended in a simple manner for the purpose of carrying out the method.

In order to correct the insertion position of the picture to be inserted, it is suitable to effect adaptation of the number of pixels after which, in each case measured from the beginning of a line of the main picture, a line of the picture to be inserted is inset into the main picture, by a factor. This factor results from the ratio of the line duration—deviating from a nominal line duration—of a line of the main picture and said nominal line duration. The nominal line duration is the length of a signal with the signal content for a line of the main picture given undisturbed transmission and processing of the signal.

The error in the measurement of the line duration can be reduced if the line duration is averaged over a plurality of lines of the main picture. When determining the line duration for a line, the time between two successive start pulses is measured. In the event of averaging, the time between a first start pulse and, for example, the sixth start pulse following said first start pulse is determined. The averaged line duration is then ⅙ of this time.

In the case of picture insertion, the signal for the main picture is synchronized with that for the picture to be inserted. By counting down clock cycles starting from the occurrence of the start pulse, it is possible to determine where within a line of the main picture the picture to be inserted is to be inset. During a clock cycle, a specific number of pixels are displayed on the screen. Thus, during a plurality of clock cycles, a multiple of the pixels of one clock cycle are displayed.

Jagging of vertical edges of the picture to be inserted can be counteracted by an insertion position that has been determined also being maintained during the subsequent lines of the main picture independently of the actual line duration. By way of example, it may be provided that the insertion position is uniform within a field of the main picture. A newly calculated insertion position is used only for the lines of the subsequent field.

According to a further embodiment of the invention, a present insertion position is departed from only when the difference between the current line duration and the previously calculated line duration exceeds a specific magnitude. In order to avoid jumping back and forth between two insertion positions, said magnitude can be chosen to be different depending on whether the difference has a positive or negative sign.

Further advantageous designs and developments are characterized in subclaims.

BRIEF DESCRIPTION OF THE DRAWINGS

The invention is explained in more detail below with reference to the single figure, in which.

DETAILED DESCRIPTION OF THE INVENTION

Figure 1A:
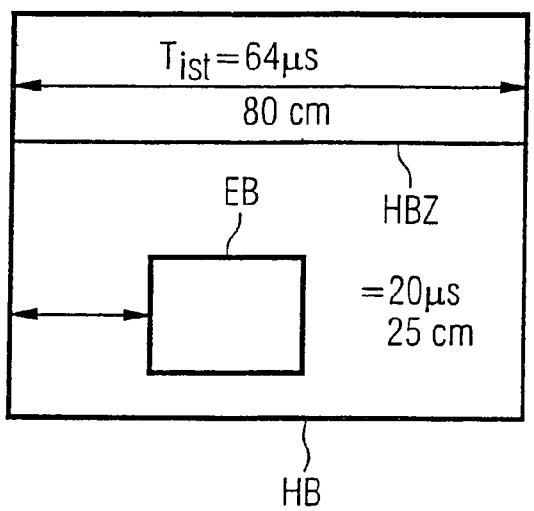
FIG. 1 shows an illustration for elucidating the insertion position.

FIG. 1a diagrammatically illustrates a main picture HB and an inset picture EB which is inserted into the main picture HB. The main picture HB is composed of picture lines, one of which is emphasized as main picture line HBZ in FIG. 1a. The picture lines of the main picture HB are formed by pixels. The main picture HB is transmitted via a main video signal HVS which also contains control pulses in addition to the actual picture information that is to be represented on a screen. The control pulses serve to ensure that a picture information item transmitted at a specific point in time is displayed at the location intended for it on the screen. The control signals have a horizontal pulse IP. The latter in each case signals the beginning of a new main picture line.

By way of example, if the main picture HB is intended to be represented on a cathode ray tube, then the main video signal HVS must be synchronized with the electron beam which scans the screen line by line in such a way that when the horizontal pulse IP occurs in the main video signal HVS, the electron beam jumps to the beginning of a new main picture line HBZ.

The time interval between the beginning of a first horizontal pulse and the beginning of a second horizontal pulse directly following the former is designated as the nominal line duration HZD of the main picture line HBZ. In the PAL television standard, the nominal line duration NZD is 64 μs. The nominal line duration is a desired value which is valid under ideal conditions. As a result of interference superposed on the main video signal HVS, or inaccurate detection of the horizontal pulse IP, an actual line duration TZD may be longer or shorter than the nominal line duration NZD. This is the case in particular when the recorded main video signal HVS is reproduced by means of a video recorder.

When the inset picture EB is inserted into the main picture HB, the pixels of the main picture HB which lie in a window defined by the inset picture EB are determined by a video signal assigned to the inset picture EB.

Within the main picture HB, the inset picture EB can adopt various vertical and horizontal positions. The vertical position of the inset picture EB can be described for example by the number of the main picture line in which the first line of the inset picture EB is located. If this is the first main picture line, then the inset picture EB is situated at the top edge of the main picture HB.

The horizontal position HP of the inset picture EB can be described as the number of pixels between the beginning of the main picture line HBZ and a first pixel of a line of the inset picture EB.

The insertion of the inset picture EB must be synchronized with the main picture HB in order that a stationary inset picture can be seen on the screen. The synchronization is achieved using a phase shifter which couples the main video signal HVS to the video signal for the inset picture by their phases.

With regard to a horizontal direction in the main picture HB, the inset picture EB is inserted when a specific number of clock cycles have been counted after the occurrence of the horizontal pulse IP in the main video signal HVS. During each clock cycle, in the main picture line that is currently to be constructed, a constant number of pixels for this line are displayed on the screen. The more clock cycles have elapsed since identification of the horizontal pulse IP, the further the corresponding main picture line is constructed. Within the horizontal direction, the inset picture EB is begun at the location at which the pixels of the main picture HB would be represented at a considered point in time if no insertion were provided. Thus, a desired horizontal position WP is dependent on the specific number of clock cycles which are counted after the horizontal pules IP.

In the example according to FIG. 1a, 20 μs have elapsed since the start of the main picture line HBZ, that is to say since the occurrence of the horizontal pulse IP, up to an insertion instant. It is assumed that this corresponds to 300 clock cycles. Within these 300 clock cycles, the pixels of the main picture HB are displayed on the screen, and afterward, for a number of clock cycles which is dependent on the size of the inset picture EB, the pixels of the inset picture EB are displayed on the screen.

If it is assumed that the actual line duration TZD is equal to the nominal line duration NZD, then, in the example according to FIG. 1a, the inset picture EB is inserted at a distance of 25 cm from the left-hand edge. The 25 cm correspond to the desired horizontal position WP, which is also the actual horizontal position HP in this case. It shall be assumed here that the length of the main picture line ZBZ=80 cm.

Figure 1B:
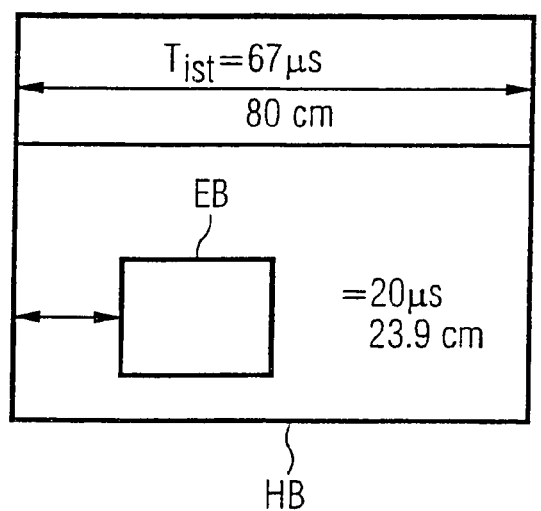

In FIG. 1b, the actual line duration TZD=67 μs deviates from the nominal line duration NZD=64 μs. The main video signal HVS is still imaged on the 80 cm of the screen. The inset picture EB is once again inserted 20 μs after detection of the horizontal pulse IP. The number of clock cycles between two successive horizontal pulses is larger in the case of a shorter line duration. In order to display the inset picture EB on the far right in the main picture HB, a larger number of clock cycles must elapse than in the example according to FIG. 1a with the nominal line duration NZD. If the inset picture EB is once again inserted 300 clock cycles, which corresponds once again to 20 μs, after the occurrence of the horizontal pulse IP, then it appears on the screen at a shorter distance from the left-hand picture edge of the main picture HB. The actual horizontal position HB no longer corresponds to the desired horizontal position WP. In the example according to FIG. 1b, it is assumed that the insertion already takes place after 23.9 cm compared with 25 cm in the case of the example according to FIG. 1a. The clock of the phase shifter is independent of the line duration of the main picture HB.

The method according to the invention makes use of the fact that the actual horizontal position HP is influenced by the actual line duration TZD.

If the actual line duration TZD is known, then the actual horizontal position HP can be calculated. If the calculated position will deviate from the desired horizontal position WP, a correction is performed.

There is fixed relationship between the number of clock cycles and the number of pixels, since a constant number of pixels is displayed within a clock cycle. To ensure that the inset picture EB appears at the actual horizontal position HP, e.g. 25 cm from the beginning of the main picture line, on the screen, the insertion must be effected depending on the actual line duration TZD after a different number of pixels in the main picture line. In order to achieve the insertion at the desired horizontal position WP, it is necessary, in the case of a line duration exceeding the nominal line duration NZD, for the number of pixels after the horizontal pulse IP until insertion of the inset picture EB to be greater than in the case of the nominal line duration NZD.

The specific number of pixels $b_{actual}$ after which the insertion is effected can be described by:

$$b_{actual} = b_{desired} \cdot \frac{T_{actual}}{T_{nom}}$$

where $b_{desired}$ is the number of pixels counted from the beginning of the main picture line in the case of which the line of the inset picture EB would have to be inserted at the desired horizontal position WP if the actual line duration TZD were equal to the nominal time duration NZD.

$T_{nom}$ is the magnitude of the nominal line duration NZD and $T_{actual}$ is the actual line duration TZD. It may be expedient to choose $T_{nom}$ such that the value deviates somewhat from the value prescribed by a television standard, in other words $T_{nom}$ is slightly greater or less than a standard value.

It may be advantageous, given different sources for the main video signal HVS, to use different values of $T_{nom}$ as a basis. By way of example, $T_{nom}$ is chosen differently for video recorder operation than in the case of reception of the main video signal HVS via antenna.

$b_{desired}$ results directly from the desired horizontal position WP. In the case of the nominal line duration NZD, the number of clock cycles encompassed by the main picture line HBZ is proportional to the length over which the main picture line HBZ is written on the screen. By way of example, the number of pixels after which insertion is intended to be effected is half the number of pixels of the complete main picture line HBZ if insertion in the middle of the screen is desired.

The value $T_{actual}$ for the actual line duration TZD is the time interval between two successive horizontal pulses. In order to reduce the influence of measurement errors, it is advantageous to measure the actual line duration of a plurality of main picture lines and to divide the duration thus determined by the number of lines used for the measurements, that is to say to perform averaging of the line durations over a plurality of main picture lines.

The specific number of pixels $b_{actual}$ can be used for each main picture line into which a line of the inset picture EB is intended to be inserted. In order to counteract jagging of vertical edges within the inset picture EB, it is possible, in the case of main pictures composed of fields, to choose $b_{actual}$ uniformly in each case in the field.

If $b_{actual}$ frequently changes its value within the inset picture EB, that may become apparent from shaking of the inset picture EB. Therefore, it may be provided that the calculated value of $b_{actual}$ is used for insertion purposes only when the difference between the previously determined value and $b_{actual}$ exceeds a previously defined threshold.

What is claimed is:

1. A method for inserting an inset picture (EB) into a main picture (HB) constructed from a plurality of lines, which is transmitted with a video signal (HVS) and in the case of which the construction of a new line of the main picture (HB) from pixels is begun when a start pulse (IP) is detected in the video signal (HVS), comprising:

determining the time duration between two successive horizontal start pulses (IP) to determine an actual line duration of a line of the main picture, and after a specific number—dependent on the actual line duration determined and on a desired vertical position (WP) of the inset picture (EB) within the main picture (HB)—of pixels from the beginning of a line of the main picture (HB) that is provided for the insertion, a line of the inset picture (EB) is inserted within this provided line of the main picture (HB), wherein the specific number of pixels after which the insertion is effected is described by:

$$b_{actual} = b_{desired} \cdot \frac{T_{actual}}{T_{nom}}$$

where the following holds true:

$T_{actual}$ is the actual line duration between the two successive horizontal start pulses, $T_{nom}$ is a nominal line duration (NZD) of a complete line of the main picture (HB), and $b_{desired}$ is the number of pixels from the beginning of a line of the main picture (HB) in the case of which the line of the inset picture (EB) would have to be inserted at the desired horizontal position (WP) in event of the time duration between the two successive horizontal start pulses being $T_{actual}=T_{nom}$.

2. The method of claim 1 wherein the nominal line duration (NZD) is selectable.

3. The method of claim 1 wherein the duration between an m-th start pulse and an n-th start pulse is determined and the (n-m)-th part of the duration is used for determining the specific number of pixels ($b_{actual}$), where the following holds true; n>m.

4. The method of claim 1 wherein the specific number of pixels ($b_{actual}$) is a whole-lined multiple of k pixels.

5. The method of claim 1 wherein the specific number of pixels ($b_{actual}$) after which each line of the inset picture (EB) is inserted within the respectively provided line of the main picture (HB) is uniform for all lines of the inset picture (EB).

6. The method of claim 1 wherein the specific number of pixels ($b_{actual}$) after which each line of the inset picture (EB) is inserted within the respectively provided line of the main picture (HB) is uniform for every i-th line of the inset picture (EB).

7. The method of claim 1 wherein the specific number of pixels ($b_{actual}$) after which a first line of the inset picture (EB) is inserted within the provided line of the main picture (HB) is also used for at least one line following the first line if the deviation of the number of pixels which is calculated for the following the lies below a predetermined threshold.

8. The method of claim 7 wherein the predetermined threshold consists of a first threshold value in the case of positive deviations and of a second threshold value, different from the first threshold value, in the case of negative deviations.

9. A method for inserting an inset picture (EB) into a main picture (HB) constructed from a plurality of lines, which is transmitted with a video signal (HVS) and in the case of which the construction of a new line of the main picture (HB) from pixels is begun when a start pulse (IP) is detected in the video signal (HVS), comprising:

determining the time duration between two successive horizontal start pulses (IP) to determine an actual line duration of a line of the main picture, and after a specific number—dependent on the actual line duration determined and on a desired vertical position (WP) of the inset picture (EB) within the main picture (HB)—of pixels from the beginning of a line of the main picture (HB) that is provided for the insertion, a line of the inset picture (EB) is inserted within this provided line of the main picture (HB), wherein the specific number of pixels ($b_{actual}$) after which a first line of the inset picture (EB) is inserted within the provided line of the main picture (HB) is also used for at least one line following the first line if the deviation of the number of pixels which is calculated for the following line lies below a predetermined threshold.

10. The method of claim 9 wherein the predetermined threshold consists of a first threshold value in the case of positive deviations and of a second threshold value, different from the first threshold value, in the case of negative deviations.

* * * * *